US009800739B2

(12) United States Patent
Linney et al.

(10) Patent No.: US 9,800,739 B2
(45) Date of Patent: Oct. 24, 2017

(54) METHOD AND APPARATUS FOR ALLOCATING POWER LEVELS TO A TRANSMISSION IN A DIGITAL SUBSCRIBER LINE NETWORK

(71) Applicant: British Telecommunications Public Limited Company, London (GB)

(72) Inventors: Trevor Linney, London (GB); Ian Horsley, London (GB); Trevor Morsman, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 15/318,492

(22) PCT Filed: Jul. 3, 2015

(86) PCT No.: PCT/EP2015/065248
§ 371 (c)(1),
(2) Date: Dec. 13, 2016

(87) PCT Pub. No.: WO2016/015951
PCT Pub. Date: Feb. 4, 2016

(65) Prior Publication Data
US 2017/0126899 A1    May 4, 2017

(30) Foreign Application Priority Data

Jul. 30, 2014   (EP) .................................. 14179207

(51) Int. Cl.
*H04M 11/06*   (2006.01)
*H04W 52/00*   (2009.01)
*H04M 19/00*   (2006.01)

(52) U.S. Cl.
CPC ....... *H04M 11/062* (2013.01); *H04M 19/001* (2013.01); *H04W 52/00* (2013.01)

(58) Field of Classification Search
CPC .. H04M 11/062; H04M 19/001; H04W 52/04; H04W 52/00; H04L 12/12
See application file for complete search history.

(56) References Cited

U.S. PATENT DOCUMENTS 6,204,945 B1    3/2001  Iwata et al.
7,295,621 B2 *  11/2007 Verbin ................ H04L 27/2602
                                                    375/259

(Continued)

FOREIGN PATENT DOCUMENTS

EP    2 209 325 A1    7/2010
GB    2383919 A        7/2003

(Continued)

OTHER PUBLICATIONS

International Search Report for corresponding International Application No. PCT/EP2015/065248 mailed on Oct. 9, 2015; 4 pages.

(Continued)

*Primary Examiner* — Jean B Corrielus
(74) *Attorney, Agent, or Firm* — Patterson Thuente Pedersen, P.A.

(57) ABSTRACT

Embodiments relate to a method, and a device for performing the method, for allocating power levels to a transmission in a DSL network, the method including: identifying a first and second geographical region as being associated with a subscriber line in the DSL network; defining a first spectral mask having a first set of power levels over a range of frequencies, wherein the first set of power levels are tailored according to a Radio Frequency, RF, environment of the first geographical region; defining a second spectral mask having a second set of power levels over the range of frequencies, wherein the second set of power levels are tailored accord- (Continued)

ing to an RF environment of the second geographical region; and constructing a transmit spectral mask for the subscriber line, the transmit spectral mask based on a combination of the first and second spectral masks, including, for each frequency in the range of frequencies, using the minimum power level for that frequency from the first and second spectral masks.

17 Claims, 4 Drawing Sheets

(56) References Cited

U.S. PATENT DOCUMENTS

| | | | |
|---|---|---|---|
| 7,330,516 B2 * | 2/2008 | Cendrillon | H04B 3/32 375/295 |
| 7,496,135 B2 * | 2/2009 | Duvaut | H04Q 11/04 370/352 |
| 7,564,932 B2 * | 7/2009 | Barak | H04M 11/062 375/259 |
| 8,000,219 B2 * | 8/2011 | Fang | H04B 3/32 370/201 |
| 8,582,976 B2 | 11/2013 | Boyd | |
| 8,588,285 B2 | 11/2013 | Humphrey et al. | |
| 8,681,897 B2 * | 3/2014 | Ginis | H04B 3/32 370/201 |
| 2002/0031113 A1 | 3/2002 | Dodds et al. | |
| 2003/0108095 A1 | 6/2003 | Duvaut et al. | |
| 2004/0086274 A1 | 5/2004 | Wan et al. | |
| 2006/0228113 A1 | 10/2006 | Cutillo et al. | |
| 2015/0327184 A1 * | 11/2015 | Beattie, Jr. | H04N 21/2221 455/501 |

FOREIGN PATENT DOCUMENTS

| | | |
|---|---|---|
| GB | 1316053.6 | 3/2015 |
| WO | WO2015132562 A1 | 9/2015 |

OTHER PUBLICATIONS

Written Opinion of the International Searching Authority for corresponding International Application No. PCT/EP2015/065248 mailed on Oct. 9, 2015; 6 pages.

Extended European Search Report for corresponding EP Application No. 14179207.7 mailed on Jan. 16, 2015; 8 pages.

Rapporteur for 18/15, "G.hn: Updated Issues List for continuing work on G.hn," ITU-T Draft; Study Period 2013-2016, International Telecommunication Union, Geneva, CH; vol. 18/15 (Apr. 19, 2013), XP017580284; pp. 1-61.

"Fast access to subscriber terminals (FAST)—Power spectral density specification" IUT-T Study Group 15, International Telecommunication Union (Jul. 25, 2013); 19 pages.

Application and File History for U.S. Appl. No. 12/681,451, filed Oct. 20, 2010. Inventor: Boyd

* cited by examiner

METHOD AND APPARATUS FOR ALLOCATING POWER LEVELS TO A TRANSMISSION IN A DIGITAL SUBSCRIBER LINE NETWORK

CROSS-REFERENCE TO RELATED APPLICATIONS

The present application is a National Phase entry of PCT Application No. PCT/EP2015/065248, filed on 3 Jul. 2015, which claims priority to EP Patent Application No. 14179207.7, filed on 30 Jul. 2014, which are hereby fully incorporated herein by reference.

TECHNICAL FIELD

The present disclosure relates to a method and apparatus for allocating power levels to a transmission in a DSL network. In particular, this disclosure relates to using spectral masks for allocating power levels over a range of frequencies for a transmission in the DSL network.

BACKGROUND

Digital Subscriber Lines (DSL) are a common technology for providing digital communication. In early DSL deployments, a broadband connection to a customer's premises was provided by a DSL connection extending over an existing twisted copper pair subscriber line between two DSL modems located in the exchange (Central Office in US terminology) and the customer's premises respectively. As DSL technology developed, a large portion of each DSL connection was replaced with optical fiber by extending the fiber between the exchange and another element in the Access Network, such as the street cabinet (for Fiber-To-The-Node deployments) or Drop Point Unit (DPU) (for Fiber-To-The-Dp deployments). The broadband connection then consisted of a fiber connection from the exchange to this intermediate point, followed by a DSL over copper connection to the customer's premises. In some deployments, the broadband connection consisted of a fiber connection all the way to the customer's premises (in Fiber-To-The-Premises deployments).

DSL networks have been upgraded on an ad hoc basis, such that some subscriber lines have been upgraded to any one of the Fiber-to-the-X scenarios above. DSL connections between elements of the DSL network are grouped together in bundles, which now typically comprise a mixture of copper, Fiber-To-The-Node, or Fiber-To-The-Dp connections in a single bundle. This can create an interference (crosstalk) issue between the different types of connections in the bundle. In an example scenario, a bundle includes a first subscriber line consisting of a copper connection between the exchange and the customer's premises, and a second subscriber line consisting of a copper connection from the street cabinet to the customer's premises. In this scenario, a signal on the first subscriber line is transmitted along the copper connection from the exchange, and a signal on the second subscriber line is transmitted along the copper connection from the street cabinet. Accordingly, the transmit power levels from the street cabinet must be reduced to take into account the level of attenuation of the signal on the first subscriber line. If not (i.e. if the two signals were transmitted at the same power levels), the signal on the second subscriber line would cause a large amount of crosstalk on the first subscriber line.

Network Operators therefore define the transmit power levels for transmissions in the DSL network. This is in the form of a "spectral mask", which defines the power levels for each frequency in the transmission. These spectral masks are defined by the standard bodies for each form of DSL connection (for example, Recommendation ITU-T G.992.5 for ADSL2+ and Recommendation ITU-T G.9700 for G.fast), and are applied to all subscriber lines in the DSL network.

The spectral mask will now be described in more detail, with particular reference to the spectral mask for G.fast connections as described in the G.9700 standard. The transmit Power Spectral Density (PSD) mask ("TxPSDM") is the maximum possible PSD of a transmit signal at a particular frequency for a G.fast transceiver. The TxPSDM is a mixture of the limit PSD mask ("LPM"), which specifies the absolute maximum limit of the TxPSDM, whilst the sub-carrier mask ("SM"), PSD shaping mask ("PSM"), notching mask ("NM") and low-frequency edge stop-band mask ("LESM"), shape and reduce the levels of the LPM to produce the TxPSDM.

The notching masks are capable of "notching out" specific frequency bands by reducing the power levels for those frequency bands to a negligible amount. This is used to ensure that the transmission does not interfere with other Radio Frequency (RF) services, such as local FM, DAB, aeronautical, maritime or military radio. This is particularly relevant for G.fast transmissions as the higher frequencies (compared to other DSL technologies) suffer from a greater level of electromagnetic leakage and share the same RF spectrum with several RF services.

The Network Operator therefore selects a single TxPSDM for all connections of a particular form (e.g. a TxPSDM for all G.fast connections in the DSL network, and a TxPSDM for all VDSL2 connections in the DSL network). When a new connection is set up, the particular TxPSDM for that form of connection is then used for all transmissions on that connection.

The present inventors have realized that the existing methods of allocating power levels to transmission in DSL networks can be improved.

SUMMARY

According to a first aspect of the disclosure, there is provided a method of allocating power levels for a transmission in a Digital Subscriber Line (DSL) network, the method comprising: identifying a first and second geographical region as being associated with a subscriber line in the DSL network; defining a first spectral mask having a first set of power levels over a range of frequencies, wherein the first set of power levels are tailored according to a Radio Frequency (RF) environment of the first geographical region; defining a second spectral mask having a second set of power levels over the range of frequencies, wherein the second set of power levels are tailored according to an RF environment of the second geographical region; and constructing a transmit spectral mask for the subscriber line, the transmit spectral mask based on a combination of the first and second spectral masks, including, for each frequency in the range of frequencies, using the minimum power level for that frequency from the first and second spectral masks.

Embodiments of the present disclosure may therefore provide a tailor made transmit spectral mask for the subscriber line, by only notching out frequencies used in the RF environment of the line. In this manner, the transmit spectral mask only reduces the power levels for frequencies that have a realistic chance of interfering with other RF services in the location of the subscriber line and its associated network elements. This offers increased usage of spectrum (and thus increased bandwidth and data rates) over the prior art method, which would reduce the power levels for all frequencies on each individual line regardless of whether any RF services are going to be interfered with.

Furthermore, the method of the present disclosure may construct the transmit spectral mask by identifying a hierarchy of increasingly localized geographic regions associated with the subscriber line and combining the spectral masks tailored to the RF environment of those regions. This allows an entity in the DSL network to effectively layer spectral masks together to create bespoke transmit spectral masks, without the computational complexity of individually calculating the transmit spectral mask for each subscriber line.

The first geographical region may be identified by identifying a first network element associated with the subscriber line, and the second geographical region may be identified by identifying a second network element associated with the subscriber line.

The first spectral mask may be a first notching mask and the second spectral mask may be a second notching mask, and the transmit spectral mask may be based on a combination of the first and second notching masks.

The method may further comprise: identifying a third geographical region as also being associated with the subscriber line, wherein the third geographical region is more localized than the second geographical region; defining a third spectral mask having a third set of power levels over the range of frequencies, wherein the third set of power levels are tailored according to an RF environment of the third geographical region; and the transmit spectral mask may be a combination of the first, second and third spectral masks. Thus, the method of the present disclosure may also create a transmit spectral mask based on three geographical regions, such as those covering an exchange, Drop-Point Unit and Customer Premises Equipment, associated with a subscriber line.

The third geographical region may be identified by identifying a third network element associated with the subscriber line. The third spectral mask may be a third notching mask, and the transmit spectral mask may be based on a combination of the first, second and third notching masks.

The method may further comprise, initially: receiving a request from any one of the network elements for the transmit spectral mask. Thus, the method of the present disclosure may be performed on a dedicated node in the DSL network, which may construct a transmit spectral mask in response to receiving a request from, for example, any one of the network elements.

The method may further comprise: forwarding the transmit spectral mask to any one of the network elements via a persistent management entity, the persistent management entity having a memory for storing a copy of the transmit spectral mask. Accordingly, the transmit spectral mask may be stored in the persistent management entity (which may be powered at all times) for backup purposes. The transmit spectral mask would therefore be available to the Drop-Point Unit once it has powered up following a power loss event.

The method of the present disclosure may therefore advantageously reduce the power level to the minimum power level from any one of the spectral masks. This has the additional benefit of still using that part of the spectrum, but without the risk of interfering with other RF services.

There is also provided a computer program containing computer-executable code which, when executed on a computer, causes the computer to perform the method of the first aspect of the disclosure.

According to a second aspect of the disclosure, there is provided a device for allocating power levels for a transmission in a Digital Subscriber Line (DSL) network, the device comprising: an identifier adapted to identify a first and second geographical region as being associated with a subscriber line in the DSL network; a processor adapted to define a first spectral mask having a first set of power levels over a range of frequencies, wherein the first set of power levels are tailored according to a Radio Frequency (RF) environment of the first geographical region, and a second spectral mask having a second set of power levels over the range of frequencies, wherein the second set of power levels are tailored according to an RF environment of the second geographical region; and a mask constructor adapted to construct a transmit spectral mask for the subscriber line, the transmit spectral mask based on a combination of the first and second spectral masks, wherein the mask constructor is adapted to construct the transmit spectral mask by, for each frequency in the range of frequencies, using the minimum power level for that frequency from the first or second spectral mask.

The identifier may be adapted to identify the first geographical region by identifying a first network element associated with the subscriber line, and to identity the second geographical region by identifying a second network element associated with the subscriber line.

The first spectral mask may be a first notching mask and the second spectral mask may be a second notching mask, and the transmit spectral mask may be based on a combination of the first and second notching masks.

The mask constructor may be adapted to construct the transmit spectral mask by using the minimum power level from either the first or second spectral mask for each frequency in the range of frequencies.

The device may further comprise a transmitter for forwarding the transmit spectral mask to any one of the network elements via a persistent management entity, the persistent management entity having a memory for storing a copy of the transmit spectral mask.

The identifier may be further adapted to identify a third geographical region as also being associated with the subscriber line, the processor may be adapted to define a third set of power levels over the range of frequencies, wherein the third set of power levels are tailored according to an RF environment of the third geographical region, and the transmit spectral mask may be a combination of the first, second and third spectral masks.

One of the network elements may be a Drop-Point Unit, such that embodiments of the present disclosure may construct transmit spectral masks for G.fast DSL networks. This is a particularly relevant application due to the range of frequencies used in G.fast overlapping with many other RF services and the level of electromagnetic leakage experienced by these frequencies. However, embodiments of the present disclosure may also construct transmit spectral masks for other forms of DSL networks.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
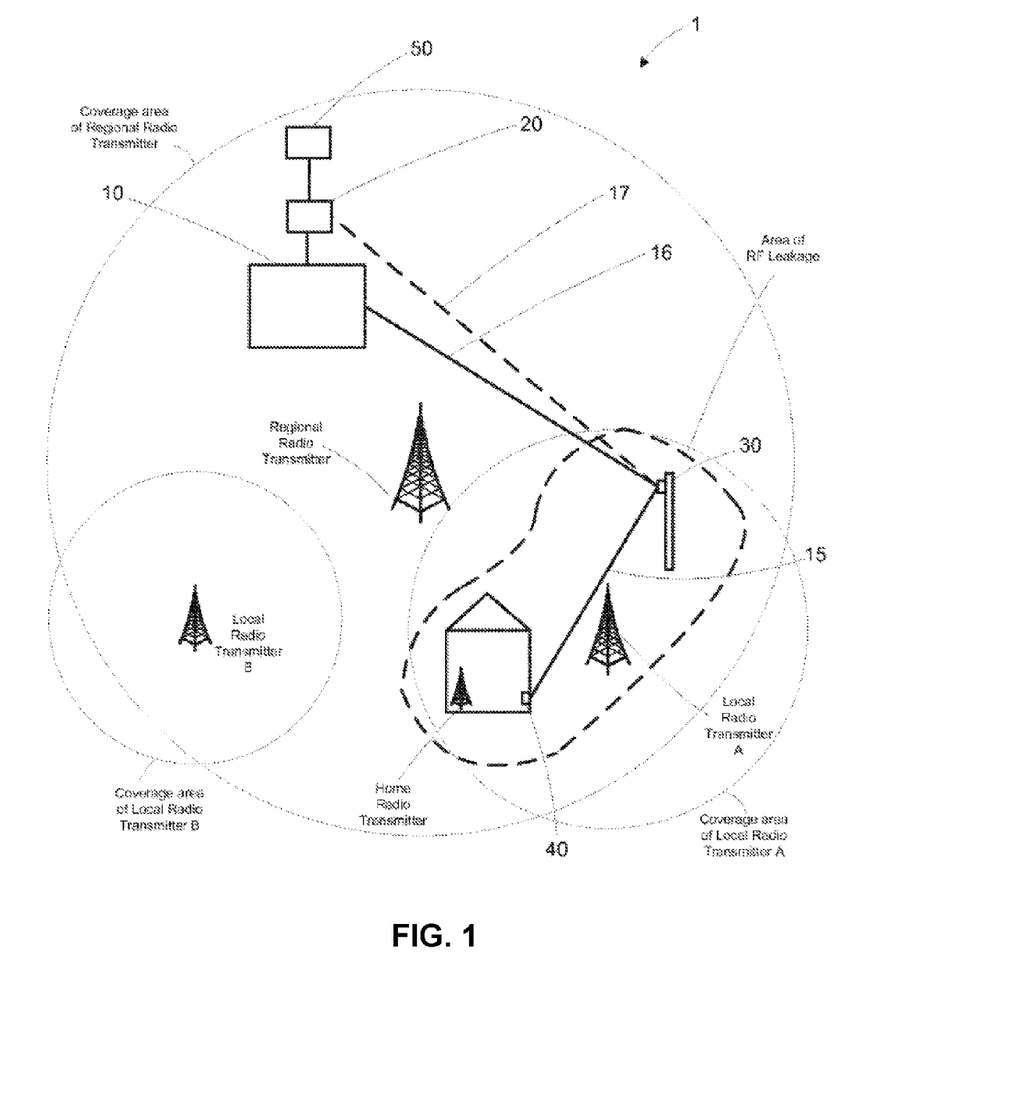
FIG. 1 is an overview of a Digital Subscriber Line network, including an exchange, Persistent Management Entity, Drop-Point Unit, Customer Premises Equipment and a mask constructor of an embodiment of the present disclosure.
Figure 2:
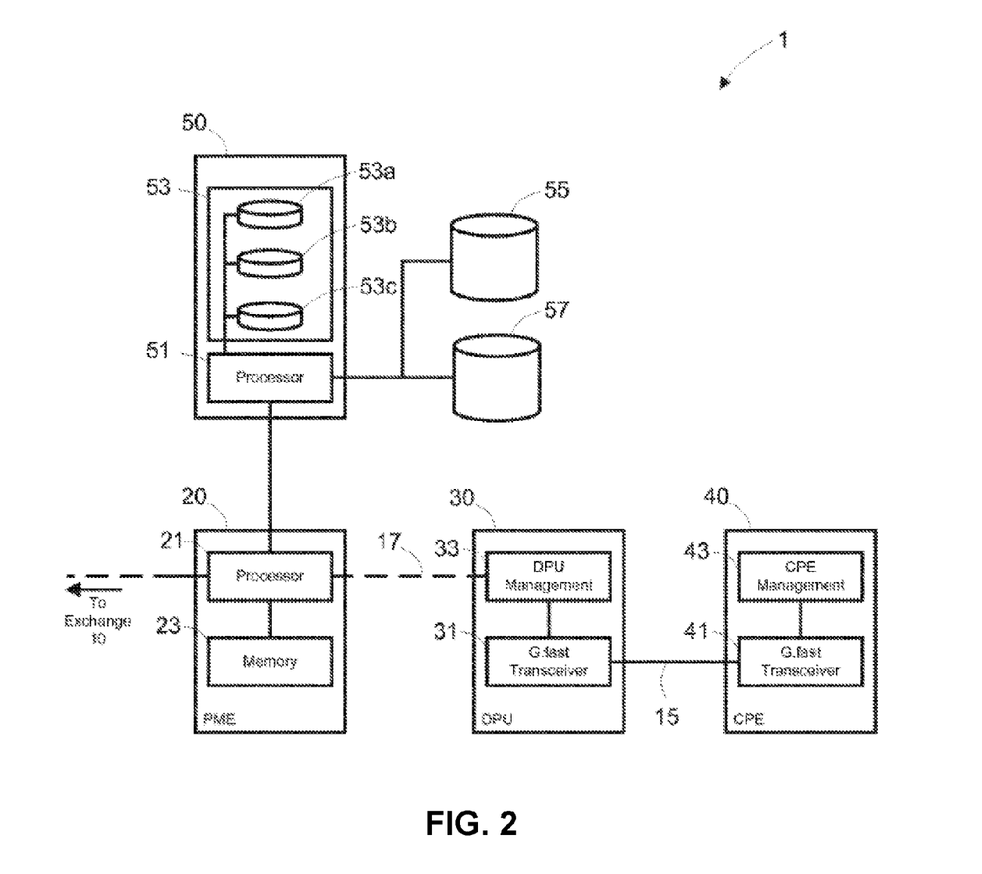
FIG. 2 is a schematic diagram illustrating the various modules of the Persistent Management Entity, Drop-Point Unit, Customer Premises Equipment and the mask constructor of FIG. 1.

An embodiment of a Digital Subscriber Line (DSL) network 1 of the present disclosure will now be described with reference to FIGS. 1 to 2. FIG. 1 illustrates an overview of the DSL network 1, which includes an exchange 10, a Persistent Management Entity (PME) 20, a Drop-Point Unit (DPU) 30, and a Customer's Premises Equipment (CPE) 40. The exchange 10, PME 20, DPU 30 and CPE 40 are all connected by a subscriber line, which consists of a fiber part 16 from the exchange 10 to the DPU 30, and a copper part 15 from the DPU 30 to the CPE 40. The skilled person will understand that the exchange 10, PME 20 and DPU 30 would normally have a one-to-many relationship with network elements lower down in the DSL network hierarchy, but a one-to-one mapping is used in this description for simplicity.

FIG. 1 also shows a mask constructor 50 connected, in this embodiment, to the PME 20. As shown in more detail in FIG. 2, the mask constructor 50 includes a processor 51, mask database 53 (including a first-level mask database 53a, second-level mask database 53b and a third-level mask database 53c). The mask constructor 50 also includes external connections to an inventory database 55, which stores information on each subscriber line in the DSL network 1 and their associated network elements, and a Radio Frequency, RF, information database 57, which stores information on the RF environment of various geographical regions. The mask constructor 50 is able to construct a transmit spectral mask for transmission along subscriber line, via a method which will be described in more detail below.

The PME 20 (also known as a Persistent Management Agent) is configured to receive and forward requests from the DPU 30 (via the fiber part 16 of the subscriber line and the exchange 10, but also over logical connection 17) for a transmit spectral mask to the mask constructor 50, and forward the transmit spectral mask from the mask constructor 50 to the DPU 30 and CPE 40, via a processor 21. The PME 20 is also able to store the transmit spectral mask in memory 23, which can be used to reconfigure the DPU 30 in the event of power loss. In this embodiment, and as explained in more detail in Applicant's UK Patent Application No. 1316053.6, the PME 20 is generally used to store metric data relating to the DPU 30. As the PME 20 has a more reliable power supply than the DPU 30 (which may be reverse powered), the PME 20 may act as a back-up or proxy for critical metric data (such as the transmit spectral mask) in the event the DPU 30 loses power.

The DSL network 1 coexists within radio coverage areas of several radio transmitters. This is illustrated in FIG. 1, which shows a regional radio transmitter, having a coverage area enveloping all network elements of the DSL network 1, a first local radio transmitter ("A") having a coverage area enveloping the DPU 30 and CPE 40, a second local radio transmitter ("B") having a coverage area which does not cover any part of the subscriber line, and a home RF transmitter, having a coverage area of the customer's premises. In this embodiment, the customer's premises has an RF receiver (not shown) configured to receive an amateur radio broadcast from a distant location.

Returning to FIG. 2, the CPE 40 and DPU 30 each comprise a G.fast transceiver 41, 31, such that they are capable of G.fast transmissions over the copper part of the subscriber line 15. The DPU 30 further includes a DPU Management module 33, which is configured to receive the transmit spectral mask from the mask constructor 50 (via the PME 20). The transmit spectral mask is used by the DPU Management module 33 to define the transmit power levels on a tone-by-tone basis for all transmissions from the G.fast transceiver 31 to the G.fast transceiver 41 over the subscriber line 15. The DPU Management module 33 may therefore control the G.fast transceiver 31 for each transmission to ensure that it never exceeds the maximum transmit power level for each frequency.

In this embodiment, the CPE 40 also includes a CPE Management module 43, which is configured to receive the transmit spectral mask from the mask constructor 50 (via the PME 20 and DPU 30). Again, the transmit spectral mask is used by the CPE Management module 43 to define the transmit power levels on a tone-by-tone basis for all transmissions from the G.fast transceiver 41 to the G.fast transceiver 31 over subscriber line 15, such that each transmission never exceeds the maximum transmit power level for each frequency.

The mask constructor 50 contains a mask database 53, which includes first, second and third-level databases 53a, 53b, 53c divided into a hierarchy. The construction of each mask in the mask database 53 will be described in more detail below. At a general level, the mask is based on the frequency usage of other RF services in a particular region. In this embodiment, the first, second and third levels of the mask database are based on a hierarchy of regions decreasing in size, such that the first mask database is associated with larger geographic regions, and the third mask database is associated with the smallest geographic regions. Each mask defines power levels tailored according to RF services that are used across that geographical region.

These masks are stored as notching masks in the mask database 53, together with an identifier for that region. In this embodiment, each mask (and thus the region it covers) is identified by a particular network element in that region, such that each first-level mask is identified by a particular exchange, each second-level mask is identified by a particular DPU, and each third-level mask is identified by a particular CPE.

Figure 3:
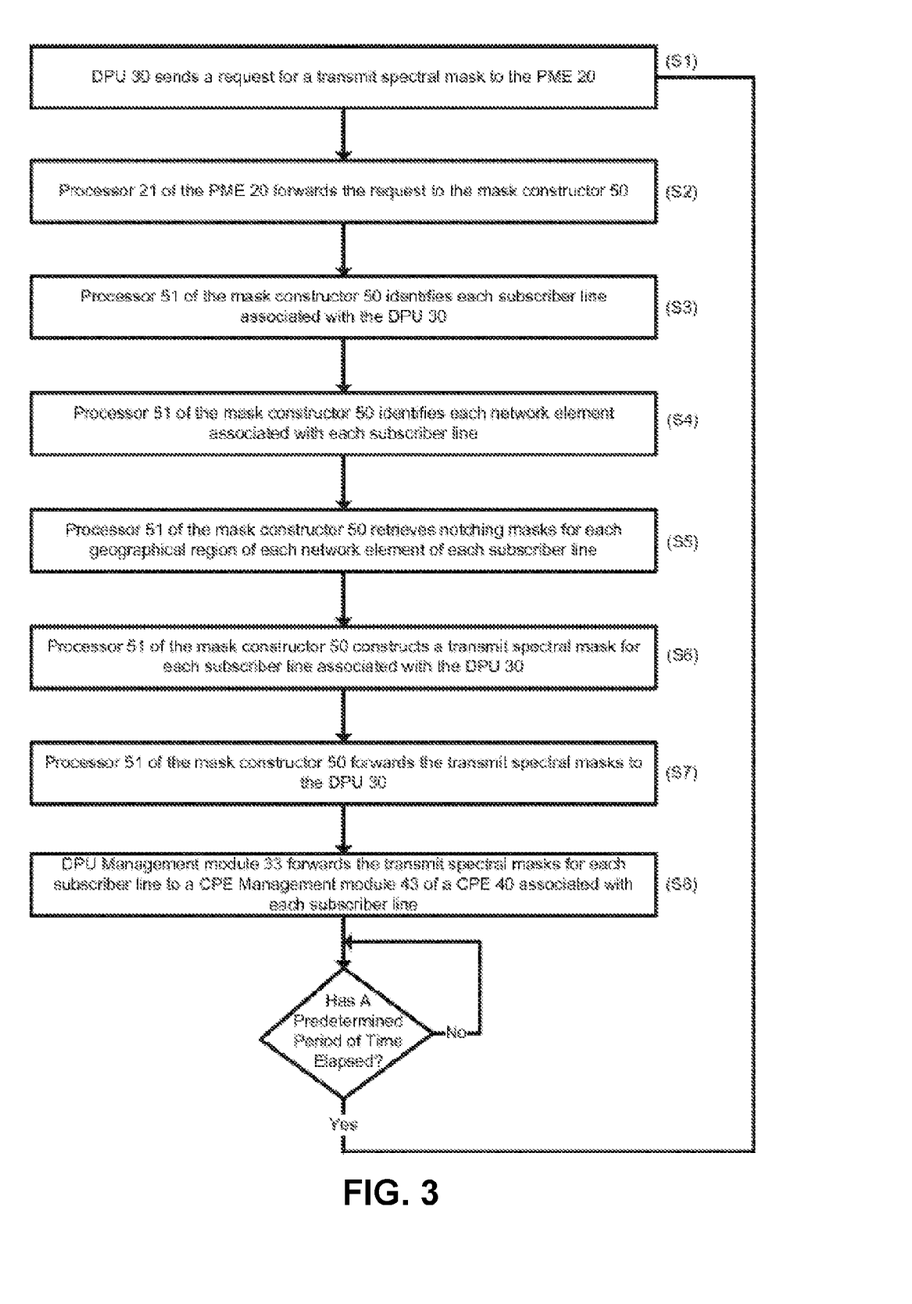
FIG. 3 is a flow diagram illustrating a method of an embodiment of the present disclosure.
Figure 4:
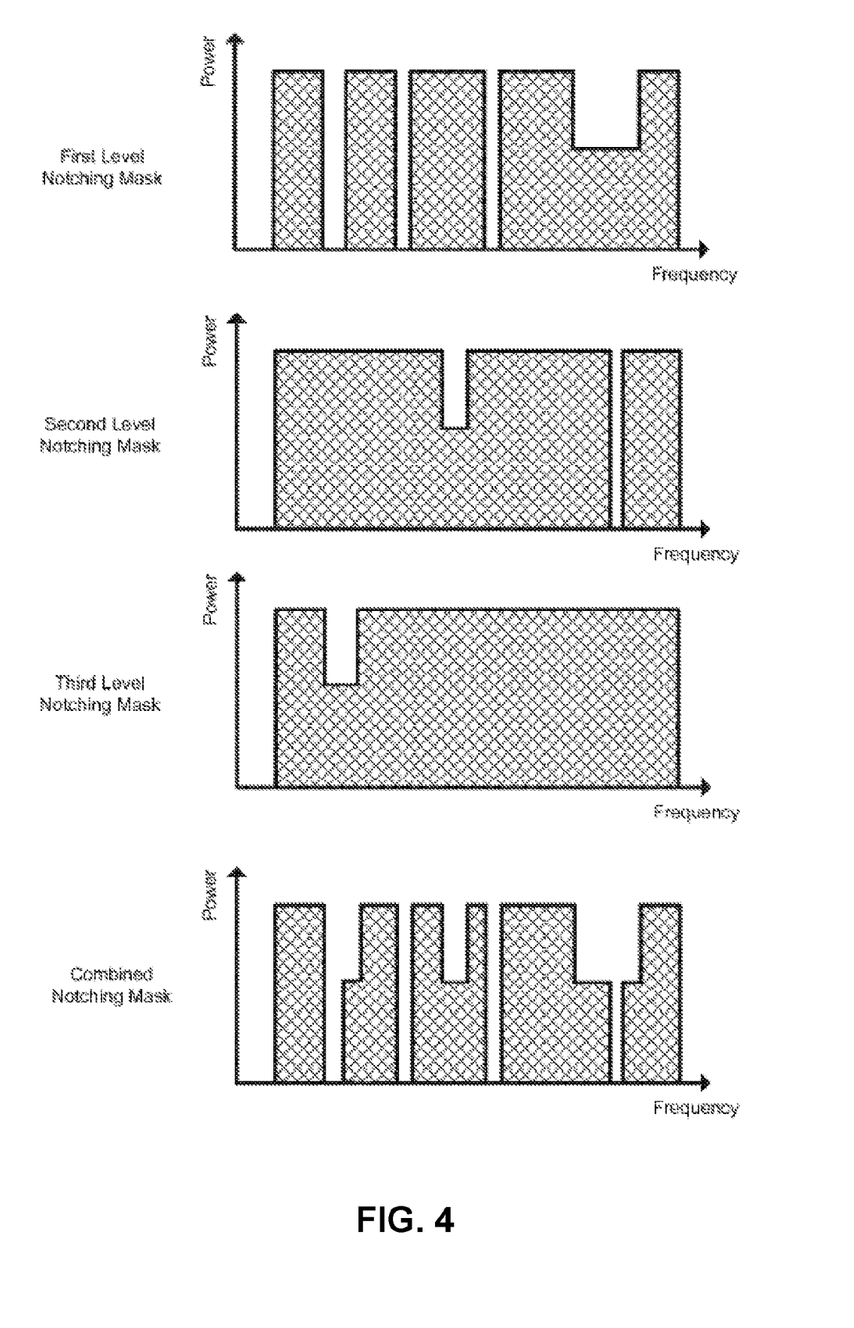
FIG. 4 is a graphical representation of the first, second and third level spectral masks and the combined notching mask of an embodiment of the present disclosure.

The construction of transmit spectral mask for a subscriber line will now be described with reference to FIGS. 3 and 4. As a first task (51), the DPU 30 is in an initialization state and requests a transmit spectral mask from the PME 20. This request includes a DPU identifier and is forwarded by the processor 21 of the PME 20 to the processor 51 of the mask constructor 50 (S2).

The processor 51 of the mask constructor 50 is configured to prepare transmit spectral masks for each line associated with that DPU 20 in response to this request. At S3, the processor 51 identifies each subscriber line associated with that DPU 20, and, at S4, identifies each network element associated with each subscriber line. In this example, the processor 51 identifies a single subscriber line and the exchange 10, DPU 30 and CPE 40 as the network elements associated with that subscriber line (although the processor 51 would usually identify several subscriber lines associated with the DPU, and their corresponding network elements). These identification steps are achieved by the processor 51 looking up the relevant information in external inventory 55, which has been populated with information on each subscriber line in the network and its associated network elements (this would usually be populated by the Network Operator as the lines are commissioned).

Once the processor 51 of the mask constructor 50 has identified the network elements associated with each subscriber line of the DPU 30, it may then determine the area that may be affected by RF leakage from the subscriber line and each of its associated network elements. As shown in FIG. 1, the processor 51 determines an area of potential RF leakage surrounding the subscriber line. The skilled person will understand that the most of the RF leakage will occur around the copper part 15 of the subscriber line, the DPU 30 and the CPE 40. The processor 51 may then retrieve notching masks for this particular area from the mask database 53.

Accordingly, the processor 51 retrieves a first-level notching mask from the first-level database 53a. This is achieved, in this embodiment, by the processor 51 sending a request including an identifier of the exchange 10 to the first-level database 53a, which then retrieves the corresponding notching mask for that exchange's region. This notching mask only includes notches corresponding to the frequencies used by other RF services which are used over a very large area, such as nationwide RF services or those used in the entire region in which the subscriber line is based (e.g. those used by the regional radio transmitter in FIG. 1).

The processor 51 also retrieves a second-level mask from the second-level database 53b. This is achieved, in this embodiment, by the processor 51 sending a request including an identifier of the DPU 30 to the second-level database 53b, which retrieves the corresponding notching mask for the DPU's region. The second-level mask includes notches for frequencies that are used on a more local level, such as those used in the area surrounding the DPU 30 (e.g. the frequencies used by local radio transmitter A, but not local radio transmitter B). In this embodiment, the mask for the DPU's region also includes notches for frequencies used by the distant amateur radio.

In this embodiment, the processor 51 also retrieves a third-level notching mask from the third-level database 53c. The third-level notching mask includes notches for frequencies used in the customer's premises (e.g. the home RF transmitter).

In a more complicated arrangement, each region may comprise a grid of smaller regions (such that each first-level region contains several second-level regions, which contains several third-level regions) and the processor 51 may be configured to calculate each region associated with the subscriber line based on the network elements associated with the subscriber line and the region between each network element through which the subscriber line passes. The mask database 53 may then contain the notching masks specific to the RF environment of each region, and the processor 51 may retrieve each notching mask by sending the identifiers for each region the subscriber line passes through to the mask database 53.

In a scenario with a greater number of subscriber lines, the processor 51 would retrieve the notching masks for each subscriber line of the DPU 30.

Once the processor 51 has received these notching masks, it may construct a transmit spectral mask for the subscriber line based on a combination of each of these notching masks (S7). In this embodiment, the processor 51 creates a combined notching mask based on the combination of each of the first, second and third-level notching masks, and applies this combined notching mask with the limit PSD mask to create the transmit spectral mask. This process of creating a combined notching mask is shown in more detail in FIG. 4, which illustrates the first, second and third-level notching masks and the resultant notching mask. In this embodiment, the processor 51 is configured to construct the transmit spectral mask by using a minimum function. Accordingly, for each frequency in the frequency range, the notching mask uses the minimum power for that frequency from the exchange, DPU, or CPE notching masks.

In a scenario in which the DPU 30 includes more subscriber lines, the transmit spectral mask for each subscriber line (based on the notching masks for each subscriber line's region) is constructed using the same method.

The processor 51 of the mask constructor 50 then forwards the transmit spectral mask for each subscriber line to the DPU 30. The transmit spectral masks are therefore forwarded via the PME 20, which stores a local copy in memory 23 for backup purposes. The DPU 30 receives the transmit spectral masks at the DPU Management module 33 (and also stores a copy in memory) ready for port activation (S7).

During the training phase of operation (S8), the DPU 30 also sends the transmit spectral mask to the CPE Management module 43 (which may be stored in memory). The DPU 30 and CPE 40 then configure their transmissions over subscriber line 15 such that the transmit power level does not exceed the power levels specified in the transmit spectral mask.

In this embodiment, the DPU 30 is configured to refresh the transmit spectral masks after a predetermined period of time (e.g. seven days). Accordingly, the DPU 30 is configured to send a new request for new notching masks to the PME 20, which repeats the steps outlined above. In the event any one of the masks in the mask database has been updated (explained in more detail below), then the DPU 30 and CPE 40 receive an updated transmit spectral mask which may be applied to the subscriber line during a retraining phase. In another arrangement, the processor 51 is configured to detect that the mask database 53 has been updated, and may then create updated notching masks automatically and push an updated transmit spectral mask to the relevant DPUs. The DPUs can then apply the updated transmit spectral mask during the next retraining phase.

Accordingly, the present disclosure provides a method of allocating power levels to transmissions in a DSL network by creating transmit spectral masks on a per line basis which are tailored to the RF environment of that line. That is, embodiments of the present disclosure accurately identify the frequencies which would otherwise be affected by electromagnetic leakage from the subscriber line and its associated network elements, and creates a transmit spectral mask in which only these frequencies are notched out. This has significant technical benefits to both the DSL network and any other system using the RF spectrum. In the prior art, notching masks are applied to the limit PSD mask which reduces the power levels for a large range of RF frequencies. However, these frequencies may not be used in all locations, such that this spectrum is not actually being used in many areas and thus available for the DSL network. Accordingly, the method of the present disclosure utilizes a greater proportion of the spectrum, without causing interference to other RF services, by using transmit spectral masks which are constructed for the RF environment of that line.

Furthermore, embodiments of the present achieves this goal by layering a series of notching masks, wherein each layer of mask notches out frequencies which are more specific to the geographical region of the subscriber line. Thus, a first level mask contains notches which are used over a large geographical region, a second level mask contains notches which are used over a smaller geographical region, and a third level mask contains notches which are used over an even smaller geographical region. In this manner, embodiments of the present disclosure create an overall notching mask for the line which is specific to that line, but only involves identifying its area of RF leakage and layering corresponding masks of increasing specificity to that line. Accordingly, this method of constructing masks reduces the computational complexity of constructing a spectral mask for each line. Embodiments of present disclosure therefore balance the potential loss of spectrum (due to an inaccurate notching mask) with computational complexity (of producing a perfect notching mask for the line).

The method of constructing the first, second and third level notching masks will now be described. As a general rule, each mask is based on the frequency usage of other RF services which cover a particular geographical region.

To create a first-level mask, the mask constructor may use nationwide and regional factors when constructing the notching mask. For example, the mask constructor 50 may use spectrum maps (generally issued by national communications regulators, such as Ofcom in the United Kingdom) to determine what frequencies are used by other RF services on a nationwide level or across that particular region. To ensure that these frequencies are genuinely at risk of being interfered with by the DSL network, the mask constructor 50 may use the locations of the transmitters for these other RF services and a propagation model (i.e. taking into account the inverse square attenuation of the signal through the air and the greater levels of attenuation due to geographical obstructions) to determine the extent of reduction required for the power levels of the first-level notching mask in order to prevent interference with these transmitters, or whether the power levels need to be reduced at all.

The mask database 53 may therefore include a plurality of first-level masks, each for a particular region and including only the frequencies which are used in that particular region. Each first-level mask may be stored in the first-level database 53*a* with a corresponding identifier. In one embodiment, the geographical region may cover an area enveloping each subscriber line for a particular exchange. The notching mask for this region thus covers frequencies used in this area and can use the particular exchange as an identifier.

To create a second-level mask, the mask constructor 50 may again use spectrum maps from the national communications regulator to determine what frequencies are used by other RF services. However, as the region covered by the second-level mask is smaller than a first-level mask, the mask constructor 50 may perform a more detailed analysis of the propagation model from transmitters in the region to determine if those frequencies are genuinely at risk. Furthermore, the mask constructor 50 may also consult a database of local radio frequencies to determine if any other frequencies need to be reduced to ensure there is no impact on local RF services. This may include amateur radio licensed bands or satellite uplinks (e.g. a Radio Astronomy Receiver). In another method, the RF environment of the region could be directly measured to determine exactly what radio frequencies are in use in the area.

As noted above, the customer's premises may include an amateur radio receiver for receiving long-range RF transmissions. To mitigate any interference, the second-level notching mask for the geographical region of the customer may include notches for that RF transmission. In the arrangement in which the second-level mask is identified by the particular DPU in that region, the second-level mask identified by the DPU serving that customer, and those identified by nearby DPUs, may include notches for that RF transmission. The mask constructor 50 may be configured to receive requests from customers that a particular frequency is being used, and it may update the masks in the mask database accordingly.

The mask database 53 may therefore include a plurality of second-level masks, each for a particular region and including only the frequencies which are used in that particular region. The skilled person will understand that as the geographical region of a first-level mask is greater than that of the second-level mask, there would be several second-level masks corresponding to more specific areas within the first-level mask and covering only the RF services used in that particular area. The second-level notching masks may be stored in the second-level database 53*b* with a corresponding identifier for that region. In one embodiment, the geographical region may cover an area enveloping each subscriber line of a particular DPU. The notching mask for this region thus covers frequencies used in this area and can use the particular DPU as an identifier.

To create a third-level mask (which generally corresponds to a very small geographical area, such as the customer's premises), the RF environment of the customer's premises may be directly measured (this may be done at the time of CPE deployment). This may be performed to ensure there is no interference with an in-home broadcast receiver. The notching mask for the CPE may then be constructed to reduce the power levels for only those frequencies which are used across the geographical region of the customer's premises.

The skilled person will understand that there are other methods and sources of RF information that could be used to create the notching masks for each geographical region. For example, the mask constructor 50 may use an initial mask and iteratively update it in response to analysis of RF interference events or a request for protection from a specific radio user in a particular geographic area.

As noted above, the processor 51 is configured to retrieve the masks corresponding to the region of a subscriber line and its network elements. This is achieved, in the above embodiment, by the processor 51 identifying the various network elements the subscriber line is associated with and retrieving notching masks tailored to the geographical region of that network element (wherein the notching masks for higher level network elements, such as the exchange, typically notch out frequencies used across a large geographical region, whereas notching masks for lower-level network elements, such as the DPU or CPE, typically notch out frequencies used across a smaller geographical region). This provides a simple method of identifying the relevant regions and producing notching masks tailored for those regions. However, the skilled person will understand that other methods may be used in embodiments of the present disclosure. For example, the processor 51 may be configured to map out the area of RF leakage from all points of the subscriber line (i.e. including the region surrounding the subscriber line as it extends between two network elements), identify these geographical regions and retrieve the relevant masks from the mask database 53. This may include one or more masks from each level of the mask database 53.

As noted above, the mask constructor 50 is capable of updating the notching masks for each geographical region over time. The skilled person will understand that the information on the RF environment on each geographical region may be updated periodically (e.g. by future measurement, or in response to complaints of RF interference), and the mask constructor 50 may then create an updated notching mask and store it in the mask database 53 together with the corresponding identifier for that geographical region. Thereafter, the mask constructor 50 will create a transmit spectral mask from the updated notching masks for that geographical region, which is then reported (either automatically or in response to a request) to the DPU 30 to be applied at the next retraining event.

The skilled person will understand that it is not essential to build the transmit spectral masks from all of the first, second and third-level masks. The present invention may instead identify just two geographical regions associated with a subscriber line, and construct a transmit spectral mask by combining the notching masks for these two geographical regions. In most circumstances, the first and second-level masks would be the most important, as these cover the largest geographical regions and therefore have the greatest impact on other RF services.

Furthermore, the skilled person will understand that it is not essential for the method of the present disclosure to be performed in a single processing module or a dedicated unit. That is, performance of the various steps could be distributed about several processing modules which may be distributed anywhere in the network. It is also non-essential to route the transmit spectral mask through the PME 20, but beneficial as the PME 20 may store the transmit spectral mask for backup purposes (as it has a dedicated power supply).

The above description relates to a G.fast DSL deployment. This is the most relevant form of DSL for this invention as the frequencies used are more susceptible to RF leakage and also overlap with other popular RF services. However, the skilled person will understand that the present invention is applicable to all forms of DSL (current or future versions). For example, the present invention is equally applicable to VDSL and VDSL2, in which a notching mask for the street cabinet may be stored in the mask database. In this scenario, the street cabinet can forward a request for a transmit spectral mask to the mask constructor 50, which can then create transmit spectral masks for all subscriber lines associated with the street cabinet using the street cabinet's notching mask.

In the above description, the transmit spectral mask is constructed by taking the minimum power level for each frequency from the first, second and third-level notching masks. This has the added benefit of only reducing the power levels to the extent necessary to reduce any impact on other RF services. However, the skilled person will understand that another method may be applied of simply reducing the power level of the transmit spectral mask to zero or a negligible amount for any frequency which may affect other RF services in the RF environment of the exchange, DPU or CPE or the subscriber line. This may be achieved by applying an 'OR' function when computing the transmit spectral mask.

The skilled person will understand that any combination of features is possible within the scope of the invention, as claimed.

The invention claimed is:

1. A method of allocating power levels for a transmission in a Digital Subscriber Line (DSL) network, the method comprising:
   identifying a first and second geographical region as being associated with a subscriber line in the DSL network;
   defining a first spectral mask having a first set of power levels over a range of frequencies, wherein the first set of power levels are tailored according to a Radio Frequency (RF) environment of the first geographical region;
   defining a second spectral mask having a second set of power levels over the range of frequencies, wherein the second set of power levels are tailored according to an RF environment of the second geographical region; and
   constructing a transmit spectral mask for the subscriber line, the transmit spectral mask based on a combination of the first and second spectral masks, including, for each frequency in the range of frequencies, using the minimum power level for that frequency from the first or second spectral masks.

2. A method as claimed in claim 1, wherein the first geographical region is identified by identifying a first network element associated with the subscriber line, and the second geographical region is identified by identifying a second network element associated with the subscriber line.

3. A method as claimed in claim 2, wherein the first spectral mask is a first notching mask and the second spectral mask is a second notching mask, and the transmit spectral mask is based on a combination of the first and second notching masks.

4. A method as claimed in claim 3, further comprising:
   forwarding the transmit spectral mask to any one of the network elements via a persistent management entity, the persistent management having a memory for storing a copy of the transmit spectral mask.

5. A method as claimed in claim 3, further comprising:
   identifying a third geographical region as also being associated with the subscriber line;
   defining a third spectral mask having a third set of power levels over the range of frequencies, wherein the third set of power levels are tailored according to an RF environment of the third geographical region; and
   wherein the transmit spectral mask is a combination of the first, second and third spectral masks.

6. A method as claimed in claim 5, wherein the third geographical region is identified by identifying a third network element associated with the subscriber line.

7. A method as claimed in claim 5, wherein the third spectral mask is a third notching mask, and the transmit spectral mask is based on a combination of the first, second and third notching masks.

8. A method as claimed in claim 5, wherein creating the transmit spectral mask includes:
   for each frequency in the range of frequencies, using the minimum power level for that frequency from the first, second or third spectral masks.

9. A non-transitory computer-readable storage medium storing a computer program containing computer-executable code which, when executed on a computer, causes the computer to perform the method of claim 1.

10. A device for allocating power levels for a transmission in a Digital Subscriber Line (DSL) network, the device comprising:
    a processor adapted to:
       identify a first and second geographical region as being associated with a subscriber line in the DSL network;

define a first spectral mask having a first set of power levels over a range of frequencies, wherein the first set of power levels are tailored according to a Radio Frequency (RF) environment of the first geographical region, and a second spectral mask having a second set of power levels over the range of frequencies, wherein the second set of power levels are tailored according to an RF environment of the second geographical region; and construct a transmit spectral mask for the subscriber line, the transmit spectral mask based on a combination of the first and second spectral masks, wherein the processor is adapted to construct the transmit spectral mask by, for each frequency in the range of frequencies, using the minimum power level for that frequency from the first or second spectral mask.

11. A device as claimed in claim 10, wherein the processor is adapted to identify the first geographical region by identifying a first network element associated with the subscriber line, and to identity the second geographical region by identifying a second network element associated with the subscriber line.

12. A device as claimed in claim 11, wherein the first spectral mask is a first notching mask and the second spectral mask is a second notching mask, and the transmit spectral mask is based on a combination of the first and second notching masks.

13. A device as claimed in claim 10, further comprising a transmitter for forwarding the transmit spectral mask to any one of the network elements via a persistent management entity, the persistent management entity having a memory for storing a copy of the transmit spectral mask.

14. A device as claimed in claim 12, wherein the processor is further adapted to identify a third geographical region as also being associated with the subscriber line, the processor is adapted to define a third spectral mask having a third set of power levels over the range of frequencies, wherein the third set of power levels are tailored according to an RF environment of the third geographical region, and the transmit spectral mask is a combination of the first, second and third spectral masks.

15. A device as claimed in claim 14, wherein the processor is adapted to identity the third geographical region by identifying a third network element associated with the subscriber line.

16. A device as claimed in claim 14, wherein the third spectral mask is a third notching mask, and the transmit spectral mask is based on a combination of the first, second and third notching masks.

17. A device as claimed in claim 15, wherein the processor is adapted to construct the transmit spectral mask by, for each frequency in the range of frequencies, using the minimum power level for that frequency from either the first, second or third spectral mask.

* * * * *